Aug. 9, 1960  J. E. DAGENAIS  2,948,057
PRESS FOR SHOCK ABSORBING SPRING
ASSEMBLIES OF CRAWLER TRACTORS
Filed March 8, 1956
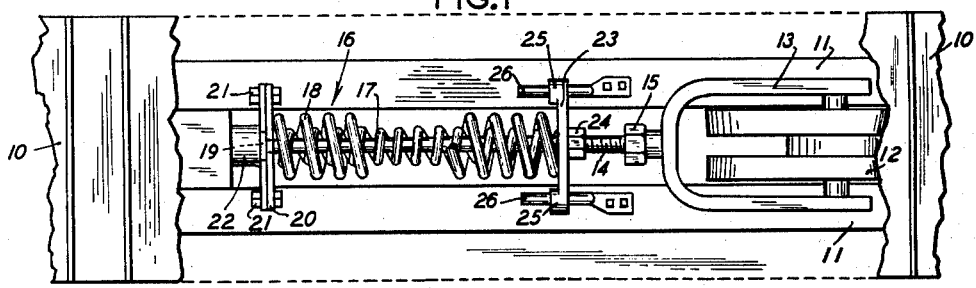
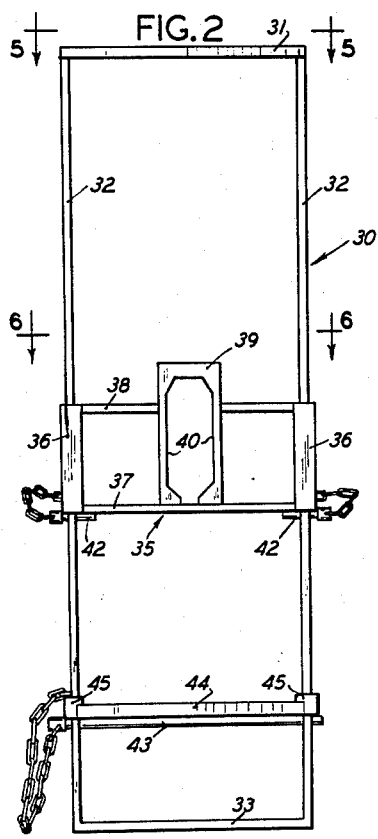
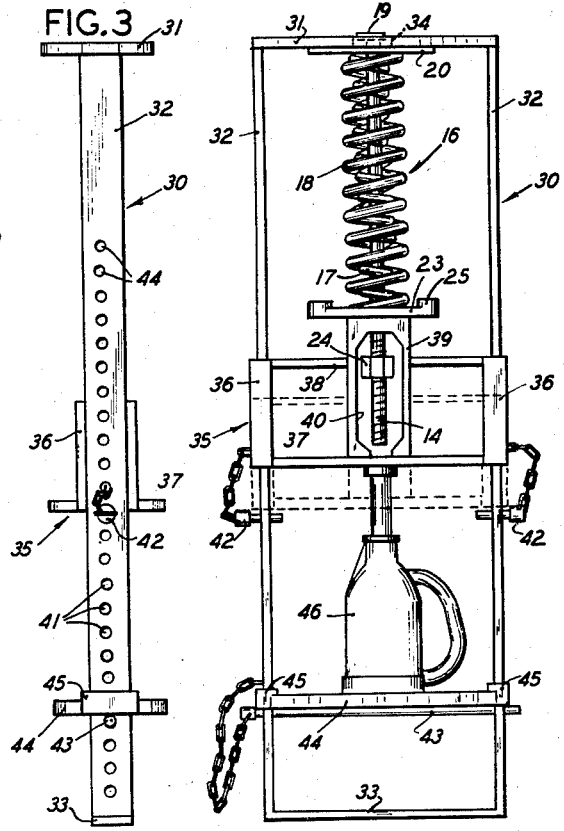
INVENTOR.
JOSEPH E. DAGENAIS

United States Patent Office 2,948,057
Patented Aug. 9, 1960

2,948,057

PRESS FOR SHOCK ABSORBING SPRING ASSEMBLIES OF CRAWLER TRACTORS

Joseph E. Dagenais, Box 1486, Cranbrook, British Columbia, Canada

Filed Mar. 8, 1956, Ser. No. 570,359

1 Claim. (Cl. 29—227)

This invention is a press for shock absorbing spring assemblies of crawler tractors.

All crawler tractors of which I am aware employ front and rear pulleys about which the tracks are trained. The front pulley is normally an idler pulley and usually is recipient of the greatest strain because when the tractor is turning, the inside front idler is moving more or less laterally and also when the tractor is going forward and strikes an obstruction, the strain is rearwardly on the front idler pulley. Very often this results in damage to the shock absorbing spring assembly by causing the stripping of threads on, bending, or breaking of the long-bolt which supports the springs under a predetermined compression.

The present invention is designed for the specific purpose of providing portable means to facilitate changing the long-bolt and making repairs to the shock absorbing spring assembly.

The present methods of repair and changing the long-bolt are time consuming and dangerous. It is customary to remove the shock absorbing spring assembly from the tractor, and then with a cutting torch cut away one half of the nut and then with a long bar and hammer drive the other half of the nut from the long-bolt. Because of the compression of the springs releasing, the parts are driven with great force and often it is difficult for the workmen to avoid being hit and maimed by something. After a new bolt is placed in position, it takes three or four men to lift the shock absorbing spring assembly in an upright position into a hydraulic press where the springs are again placed in compression and the several parts are secured in proper relationship by a new nut replacing the one that was cut away.

It is therefore the primary object of this invention to provide a press for the shock absorbing spring assemblies of crawler type tractors which is specifically designed and admirably adapted to facilitate replacing the long-bolt thereof.

Other important objects of the invention will become apparent during the course of the following description when considered in connection with the accompanying drawing wherein like numerals are employed to designate corresponding parts.

With reference to the drawing:

Figure 1 is a plan view of the shock absorbing spring assembly shown in a fragmentary portion of a crawler type tractor track;

Figure 2 is a plan view of my improved press having the shock absorbing spring assembly shown therewith in a compressed state;

Figure 3 is a side elevation of the device;

Figure 4 is a plan view of the device having the shock absorbing spring assembly removed therefrom;

Figure 5 is an end view on the plane indicated by line 5—5 of Figure 2; and

Figure 6 is a transverse cross section on the plane indicated by line 6—6 of Figure 4.

In Figure 1 of the drawing, I have shown a fragmentary portion of a crawler type tractor track, the endless track being indicated by the numeral 10 and the frame members being designated 11. The front idler 12 is journaled in a yoke 13 which is held by the long-bolt 14 and adjustably related thereto by means of the adjusting nut 15.

The shock absorbing spring assembly is indicated in its entirety by the numeral 16 and it will be noted comprises a pair of springs, one being an inner spring 17 and one an outer spring 18. At its rearward end the long-bolt 14 is provided with a conventional hexagonal head 19 which holds thereon an end piece 20 against which the springs 17 and 18 bear. The end piece 20 is further releasably secured by bolts 21 to a portion of the frame as at 22.

On its opposed end, the long-bolt 14 is threaded as shown and extends through an opposed end plate 23 which is held with the springs 17 and 18 in the proper state of compression by means of a nut 24, the springs bearing against the opposed end plate 23.

It will be noted that the end plate 23 is provided with guiding sleeves 25 which reciprocate over the guides 26 secured to the frame members 11, thereby guiding the shock absorbing movements of the assembly 16.

It will thus be seen that if an obstruction strikes the front idler 12 forcing it rearwardly, the shock will be absorbed in the springs by forcing the plate 23 rearwardly, and the body of the long-bolt 14 will pass through the end plate 20 and as soon as the pressure is relieved the spring will return the idler 12 to its normal position. Normally, the pressure of the compression springs is confined between the two end members 20 and 23 and no pressure is applied to the idler 12 from the springs, but its position is adjusted by means of the nut 15.

In the event the long-bolt 14 is bent and it is required to be removed and a new one replaced or its replacement is required for other reasons, the assembly 16 is removed from the tractor and placed in the press indicated in its entirety by the numeral 30. It will be seen that the press 30 is provided with an end plate 31 to which is secured a pair of spaced parallel perpendicular side bars 32—32, thus forming an elongated frame. At the opposed ends of the side bars 32 a tie plate 33 is secured as by welding to preclude accidental spreading of the side bars 32.

As seen in Figure 5, the end plate 31 is provided with an aperture 34 which is of a size adapted to admit the head 19 of the tractor long-bolt 14. As here shown, the end plate 31 is somewhat elliptical in shape, but it will be understood that the shape is of very little consequence, and I do not wish to be limited to the shapes shown, but I desire to claim the invention broadly, limited only by the terms of the appended claims as required by the prior art.

A compression member 35 is slidably associated with the side bars 32 for advancing movement toward and retreating movement from the end plate 31. The compression member, it will be seen, is provided with channel shaped ways 36 which receive and slide upon the side bars 32 and are united at their opposed ends by rigid cross members 37 and 38.

Inspection of Figure 6 will reveal that the cross member 37 is coincident in configuration to the end plate 31 and it will be seen that it supports a housing 39 which extends through the cross member 38 toward the end plate 31. The housing 39 is somewhat tubular in shape and has a central void into which a portion of the tractor long-bolt and nut 14 and 24 may extend. The sides of the housing 39 are open at 40 to provide access by a workman to the long-bolt and nut for facilitating his work thereon.

Figure 3 discloses that the side bars 32 are each provided with a plurality of spaced apertures 41 and the apertures, it will be understood, are to be axially aligned in pairs in the opposed side bars 32 to receive the pins 42 and 43.

On the end portion opposed to the end plate 31, the frame 30 is provided with a pressure plate 44 which is provided with ways 45 at its ends cooperating with the side bars 32 and slidably associated therewith so that the pressure plate may be advanced toward the compression member 35 and retreated therefrom.

The numeral 46 designates a power means which may be one of the many forms, such as a mechanical jack or hydraulic ram, and it is removably placed between the pressure plate 44 and the compression member 35. The pressure plate 44 constitutes a base or support means for the power means 46 so that it can be employed to shift the compression member 35 toward the end plate 31.

As seen in Figure 2, as the compression member 35 is energized, the springs 17 and 18 are compressed, thus releasing the long-bolt 14. Then by means of any convenient cutting tool, the long-bolt 14 may be severed between the head 19 and the nut 24, and it may then be removed by drawing it longitudinally through the springs 17 and 18 outwardly through the aperture 34 in the end plate 31. Subsequently a new bolt may be applied in the reverse manner and the nut 24 may be threaded thereon to the proper degree and then the jack or ram 46 may be lowered to cause the compression member 35 to retreat from the plate 31 until the compression pressure of springs 17 and 18 is resting on the nut 24 and the head 19 rather than on the end plate 31 and compression member 35.

In some instances it will be found that the power means 46 will not be sufficient to compress the springs 17 and 18 to a great enough degree in one movement, and therefore the pins 42 are moved upwardly under the compression member 35 and inserted in a selected pair of axially aligned holes. The power means 46 releases the compression member 35 to rest against the pins 42 and the pressure plate 44 is then moved along the side bars 32 toward the compression member 35 and the pin 43 again inserted at a selected point whereupon the power means is again placed between the pressure plate 44 and the compression member 35, and the compression movement of the member 35 is again effected. This may be done successively for as many times as necessary to compress the springs 17 and 18 to the desired degree. The shock absorbing assembly 16 may be released from the press in the same manner by reversing the successive steps until the asembly 16 may be removed from the press and again applied to the tractor.

Having thus described my invention, I claim:

A press for shock absorbing spring assemblies of crawler tractors, comprising a frame adapted to receive said assembly and having an end plate to which is secured a pair of spaced parallel perpendicular side bars; said end plate having an aperture of a size adapted to admit the head of a tractor long-bolt therethrough; a compression member slidably associated with said side bars for advancing movement toward and retreating movement from said end plate; said compression member being provided with a housing having a central void disposed in axial alignment with the aperture of said end plate and adapted to receive a portion of a tractor long-bolt and the nut thereof; said housing having an open side through which the nut and portion of said long-bolt is accessible; said side bars having a plurality of apertures spaced longitudinally thereof and disposed in laterally aligned pairs; pins in selected pairs of said apertures and manually movable to other selected pairs for securing said compression member to said side bars with respect to said end plate according to manual selection; and powered means for advancing and retracting said compression member.

References Cited in the file of this patent

UNITED STATES PATENTS

| | | |
|---|---|---|
| 1,372,350 | Hunn | Mar. 22, 1921 |
| 1,456,796 | Gross | May 29, 1923 |
| 1,758,451 | Manley | May 13, 1930 |
| 2,160,446 | Stalfort | May 30, 1939 |
| 2,234,819 | Butcher | Mar. 11, 1941 |
| 2,314,589 | Mandl | Mar. 23, 1943 |
| 2,387,839 | Frost | Oct. 30, 1945 |
| 2,566,460 | Mihalic | Sept. 4, 1951 |